(12) United States Patent
Chen (10) Patent No.: US 7,721,874 B2
(45) Date of Patent: May 25, 2010

(54) ROLLER CHAIN FOR A LINEAR GUIDEWAY

(75) Inventor: Tsung-Jen Chen, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 126 days.

(21) Appl. No.: 12/024,356

(22) Filed: Feb. 1, 2008

(65) Prior Publication Data

US 2008/0116038 A1    May 22, 2008

Related U.S. Application Data (63) Continuation-in-part of application No. 11/470,248, filed on Sep. 5, 2006, now abandoned.

(51) Int. Cl.
*B65G 17/24* (2006.01)
(52) U.S. Cl. .............. 198/779; 384/45; 384/51
(58) Field of Classification Search ............ 198/779, 198/850, 851, 852, 853; 384/43, 44, 45, 384/51

See application file for complete search history.

(56) References Cited

U.S. PATENT DOCUMENTS

| | | | | |
|---|---|---|---|---|
| 4,231,469 A | * | 11/1980 | Arscott | 198/779 |
| 4,880,107 A | * | 11/1989 | Deal | 198/779 |
| 4,909,380 A | * | 3/1990 | Hodlewsky | 198/779 |
| 4,961,651 A | * | 10/1990 | Rabe | 384/51 |
| 5,352,047 A | * | 10/1994 | Ingall et al. | 384/572 |
| 5,553,946 A | * | 9/1996 | Agari | 384/49 |
| 6,070,479 A | * | 6/2000 | Shirai | 74/424.88 |
| 6,203,200 B1 | * | 3/2001 | Teramachi | 384/51 |
| 6,318,544 B1 | * | 11/2001 | O'Connor et al. | 198/853 |
| 6,398,015 B1 | * | 6/2002 | Sedlacek et al. | 198/779 |
| 6,513,978 B2 | * | 2/2003 | Shirai et al. | 384/45 |
| 7,320,547 B2 | * | 1/2008 | Kuo et al. | 384/45 |
| 2002/0020609 A1 | * | 2/2002 | Lapeyre et al. | 198/779 |
| 2005/0155846 A1 | * | 7/2005 | Sofranec et al. | 198/779 |

* cited by examiner

*Primary Examiner*—James R Bidwell
(74) *Attorney, Agent, or Firm*—Banger Shia (57) ABSTRACT

A roller chain for a linear guideway comprises: a plurality of spacers each having two retaining portions and two links, each retaining portion is a hollow structure for holding the rollers. The retaining portions are formed at both sides of the rollers, one side of each of the retaining portions is opposite to the rollers, and another side doesn't contact any component, so that each two neighboring rollers are separated from each other completely. Each link is an elongated structure located at both ends of the rollers and employed to connect the spacers together. Hence, the impact energy caused when the spacer is impacted by the rollers will be converted into elastic energy, which prevents the indirect impact of two neighboring rollers caused by the spacer therebetween, thus effectively absorbing the impact force while substantially reducing the impact-caused noise.

1 Claim, 10 Drawing Sheets

DETAIL X

ROLLER CHAIN FOR A LINEAR GUIDEWAY

This application is a continuation of part of U.S. patent application Ser. No. 11/470,248, which claims the benefit of the earlier filing date of Sep. 5, 2006 now abandoned. Claim 1 of the this application is a combination of the claims 1, 2 and 3 of U.S. patent application Ser. No. 11/470,248, and claims 2-6 of the this application correspond to the previous 4-8 of U.S. patent application Ser. No. 11/470,248.

BACKGROUND OF THE INVENTION

1. Field of the Invention

The present invention relates to a roller chain for a linear guideway, and more particularly to prevent the indirect impact between two neighboring rollers caused by the spacer therebetween, thus substantially reducing the impact-caused noise.

2. Description of the Prior Art

The existing linear guideway essentially comprises a rail and a slide block. The rail is an elongated structure defined with rolling grooves for allowing the rollers to circulate therein. The slide block is reverse U-shaped and also defined with grooves for cooperating with the rolling grooves. And two end caps are installed at both ends of the slide block to enable the rollers to circulate. Each of the end caps is defined with a return path for enabling the rollers to circulate from the slide block to the rail.

The existing technologies for the roller chain are generally classified into the following categories:

First, JP Pat. No. 11-344033 discloses a roller chain as shown in FIGS. 1a-1d, the roller chain 5 comprises a plurality spacers 11, and the spacers 11 are in arc-shaped surface-to-surface contact with the rollers 3. This roller chain has the following problems:

1. Indirect impact will be caused between neighboring rollers 3 via the spacers 11.
2. The spacers 11 are in surface-to-surface contact with the rollers 3, so that the friction of the chain 12 with respect to the roller 3 is increased, and so is the rolling resistance thereof.
3. The roller chain 12 itself doesn't have enough space to reserve lubricant.
4. The roller chain is made by using the rollers 3 as a core in injection molding process, and the rollers 3 must be put in the mold before the forming the roller chain. Therefore, making such a roller chain is laboursome and time-consuming.

Figure 1A:
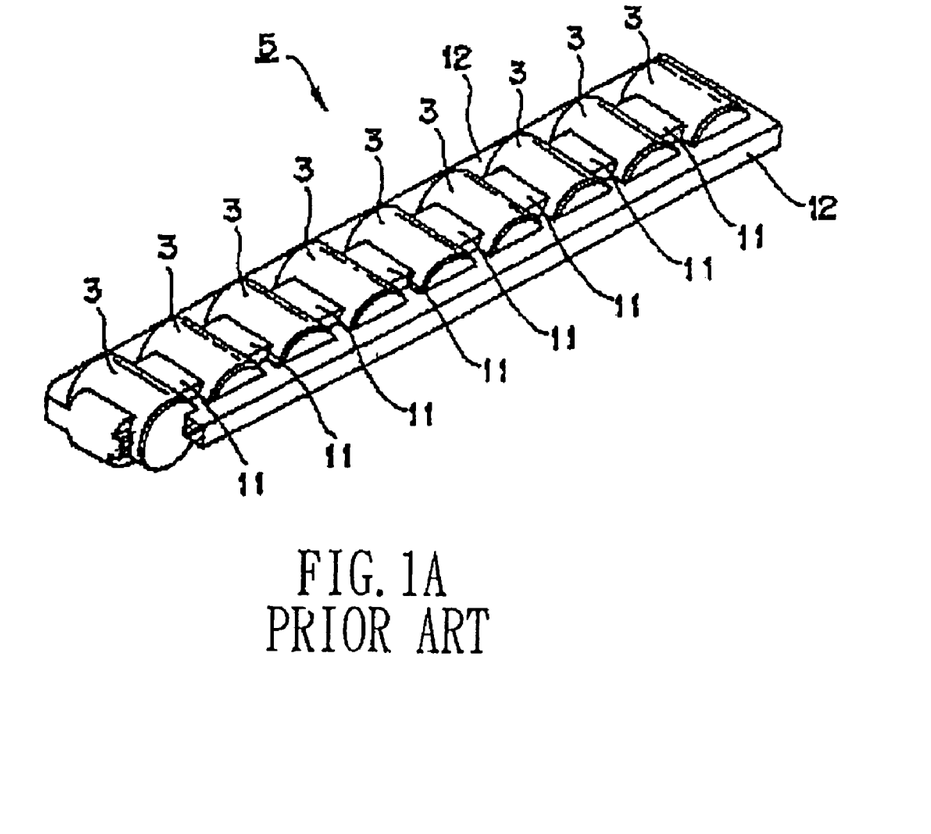
FIG. 1a is a front view of a conventional roller chain.
Figure 1B:
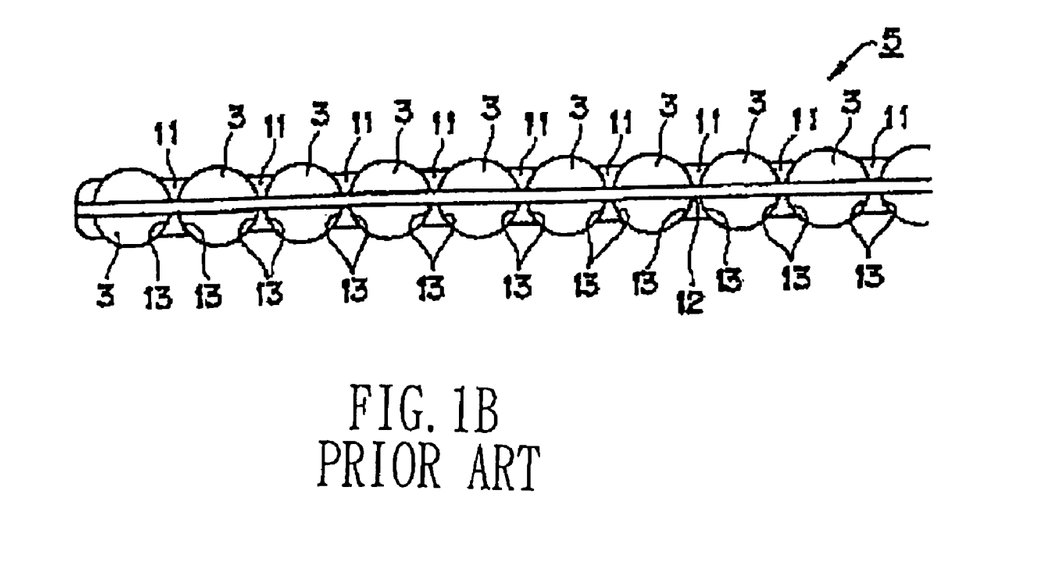
FIG. 1b is a side view of the conventional roller chain.
Figure 1C:
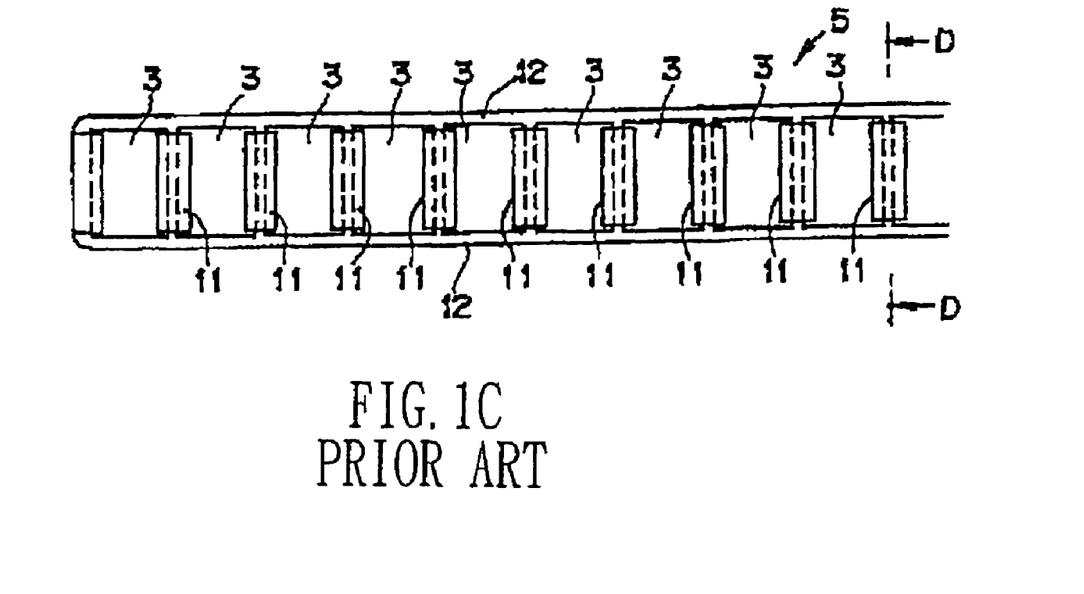
FIG. 1c is a top view of the conventional roller chain.
Figure 1D:
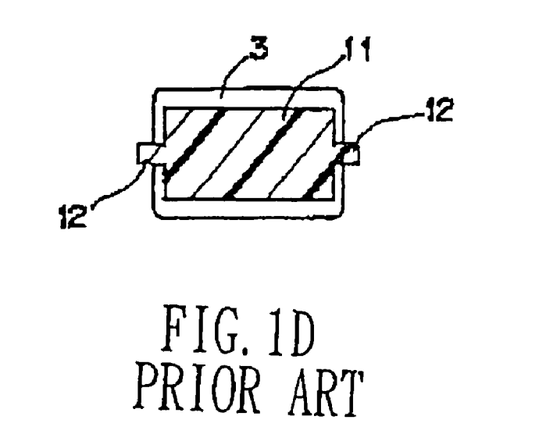
FIG. 1d is a cross sectional view of the conventional roller chain.
Figure 2:
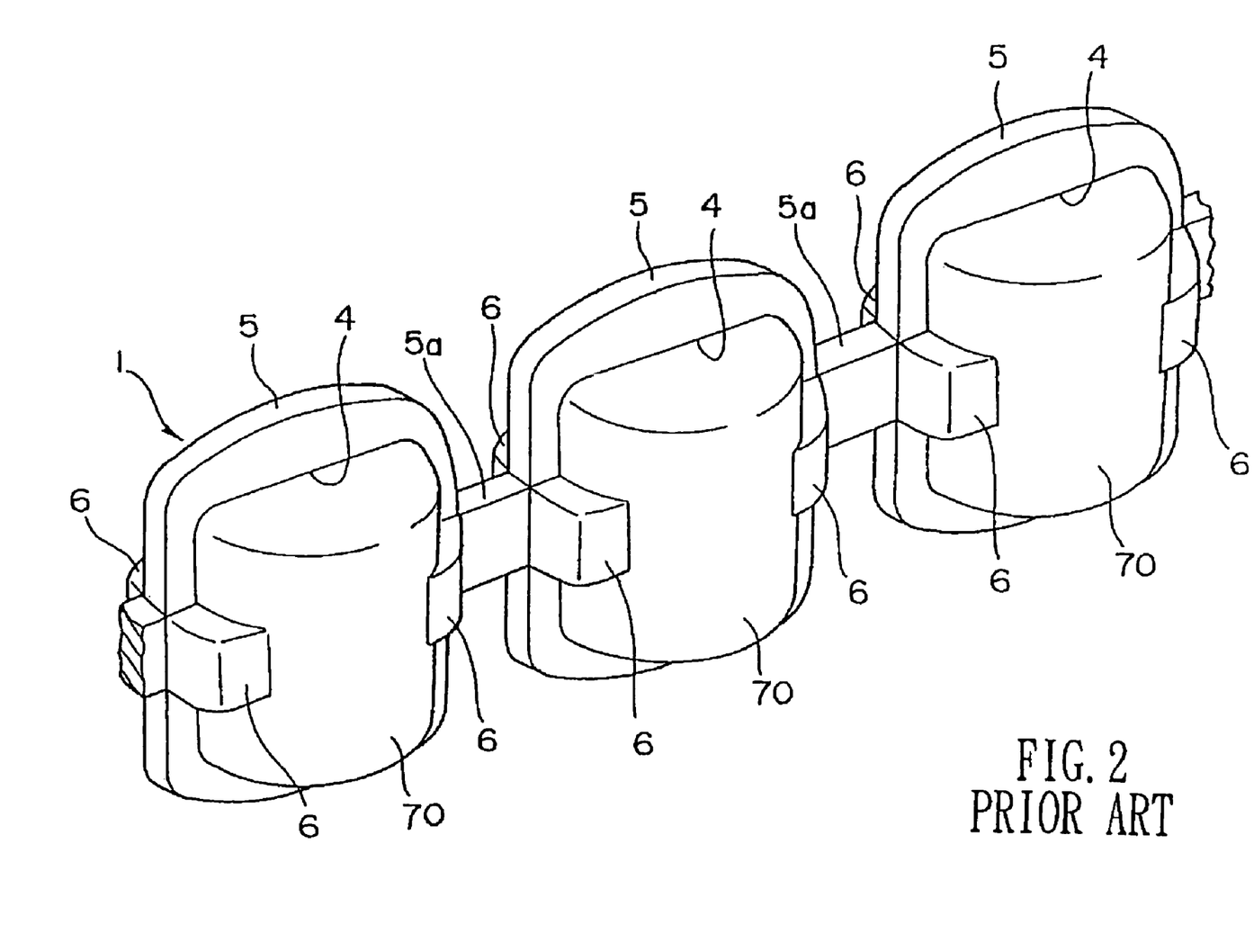
FIG. 2 is an assembly view of showing a conventional roller chain and the rollers therein.

Second, U.S. Pat. No. 6,070,479 discloses a roller chain as shown in FIG. 2, wherein the spacers 6 are formed at both sides of the respective rollers 70, each of the links 5 defines a receiving hole 4, and the spacers 6 are connected by the connecting portions 5a.

The disadvantages of this kind of roller chain are explained below:

1. Indirect impact will be caused between neighboring rollers 70 via the connecting portions 5a.
2. The contacting area of the spacers 6 with respect to the rollers 70 is large, thus increasing the rolling resistance.
3. The roller chain itself doesn't have enough space to reserve lubricant.
4. It is very difficult to manufacture such a roller chain structure.

Figures 3A, 3B, 3C:
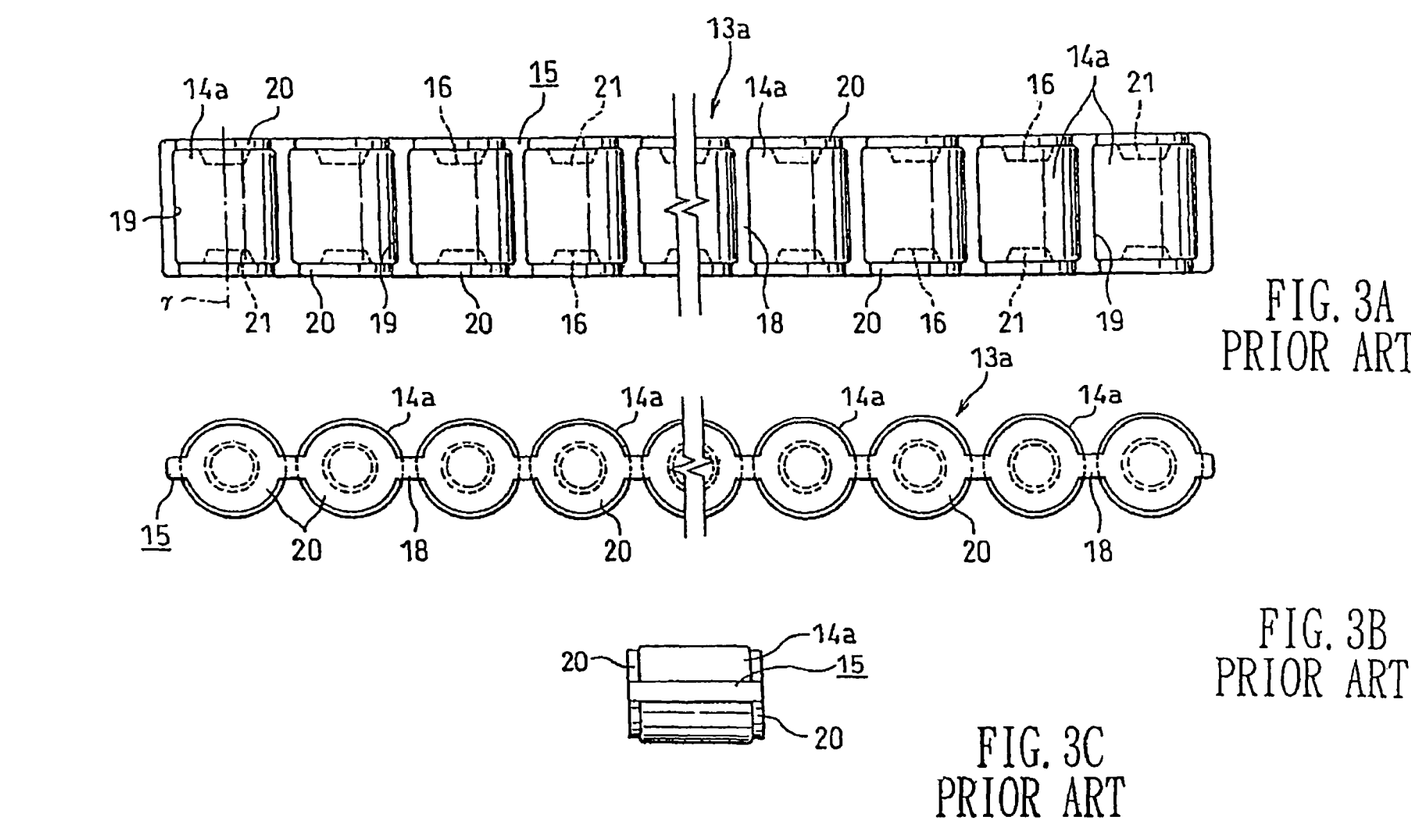
FIG. 3a is a front view of another conventional roller chain.
FIG. 3b is a side view of another conventional roller chain.
FIG. 3c is a top view of another conventional roller chain.

U.S. Pat. No. 6,203,200 discloses another roller chain as shown in FIGS. 3a-3c, wherein the roller chain is provided with a plurality of retaining portions 21 for retaining both ends 20 of the respective rollers, and a spacer 18 is arranged between each two neighboring rollers 13a.

The disadvantages of this kind of roller chain are explained below:

1. Indirect impact will be caused between neighboring rollers 13a by the spacer 18.

2. both ends 20 of the rollers are drilled with holes 16, and this will not only increase the production cost but will reduce the strength of the rollers 13a.

3. The roller chain itself doesn't have enough space to reserve lubricant.

The present invention has arisen to mitigate and/or obviate the afore-described disadvantages.

SUMMARY OF THE INVENTION

The primary objective of the present invention is to provide a roller chain for a linear guideway, and more particularly to prevent the indirect impact between two neighboring rollers caused by the spacer therebetween, thus effectively absorbing the impact force while substantially reducing the impact-caused noise.

A roller chain for a linear guideway in accordance with the present invention comprises:

a plurality of spacers and two links, each of the spacers includes two retaining portions, each retaining portion is a hollow structure serving to hold the rollers;

the retaining portions are formed at both sides of the respective rollers in such a manner that one side of each of the retaining portions is opposite to the rollers, and another side of the retaining portion doesn't contact any component, so that each two neighboring rollers are separated from each other completely. Each of the two links is an elongated structure located at both ends of the rollers and employed to connect the spacers together.

The roller chain of the present invention is a unitary structure made of flexible material, the length and the height of the hollow structure are a and b, and they satisfy the relation a>1.0 L, b≦0.8 D. An inner surface of the spacers is flat and has a predetermined thickness, so as to enable the retaining portions to be in a line-to-line contact with the rollers. One side of each of the retaining portions is opposite to the rollers, and another side of the retaining portion doesn't contact any component, so that each two neighboring rollers are separated from each other completely. The roller chain is a unitary structure, the spacers are flexible and made by injection molding, and these features facilitate mass production.

The present invention will be more clear from the following description when viewed together with the accompanying drawings, which show, for purpose of illustrations only, the preferred embodiment in accordance with the present invention.

BRIEF DESCRIPTION OF THE DRAWINGS

FIG. 5b is an amplified view of showing the part X of FIG. 5a;

FIG. 9b is an enlarged view of showing the part Y of FIG. 9a.

DETAILED DESCRIPTION OF THE PREFERRED EMBODIMENTS

The foregoing, and additional objects, features and advantages of the present invention will become apparent from the following detailed description of preferred embodiments thereof, taken in conjunction with the accompanying drawings.

Figure 4:
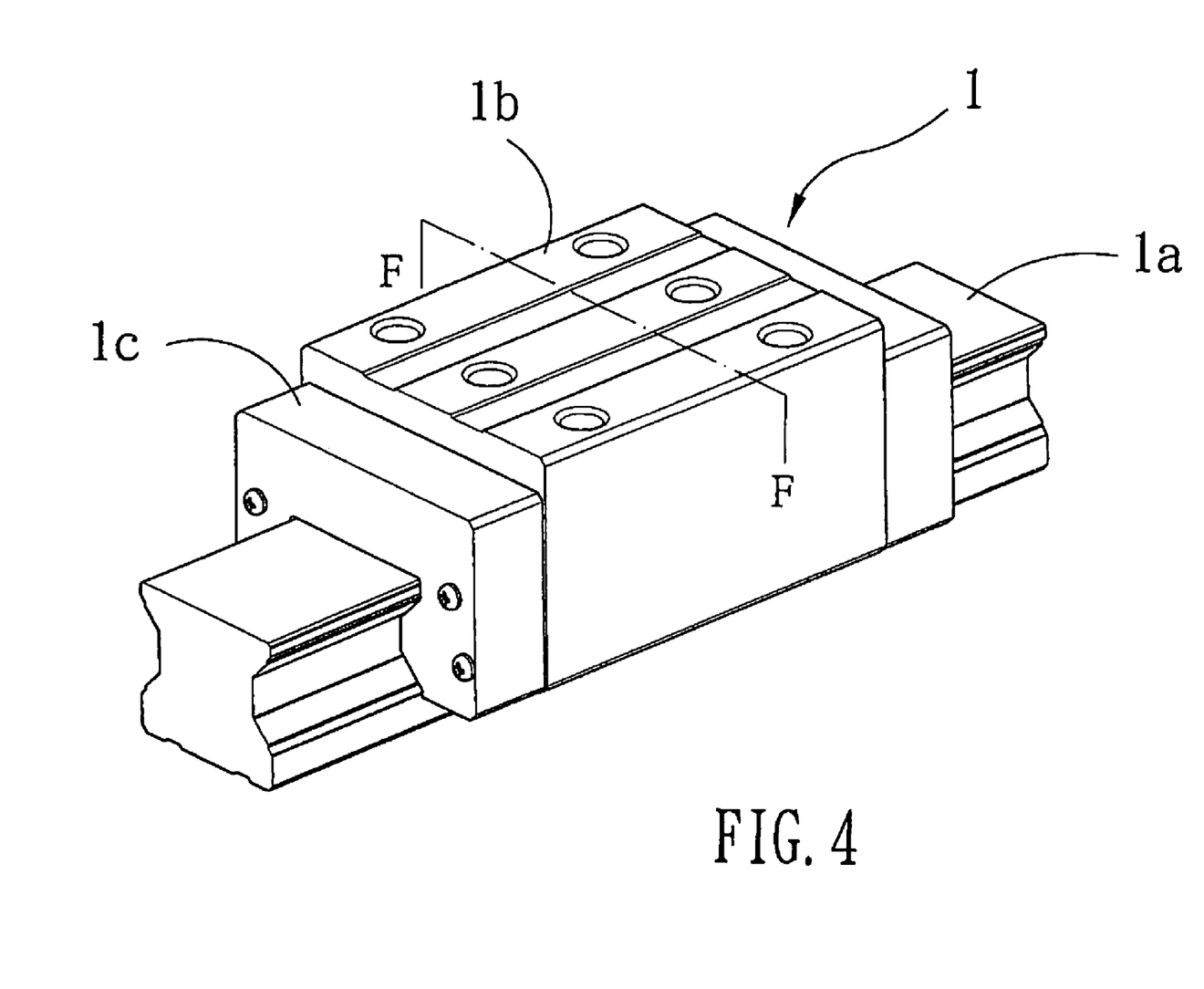
FIG. 4 is an assembly view of a roller chain for a linear guideway in accordance with the present invention.
Figure 5A:
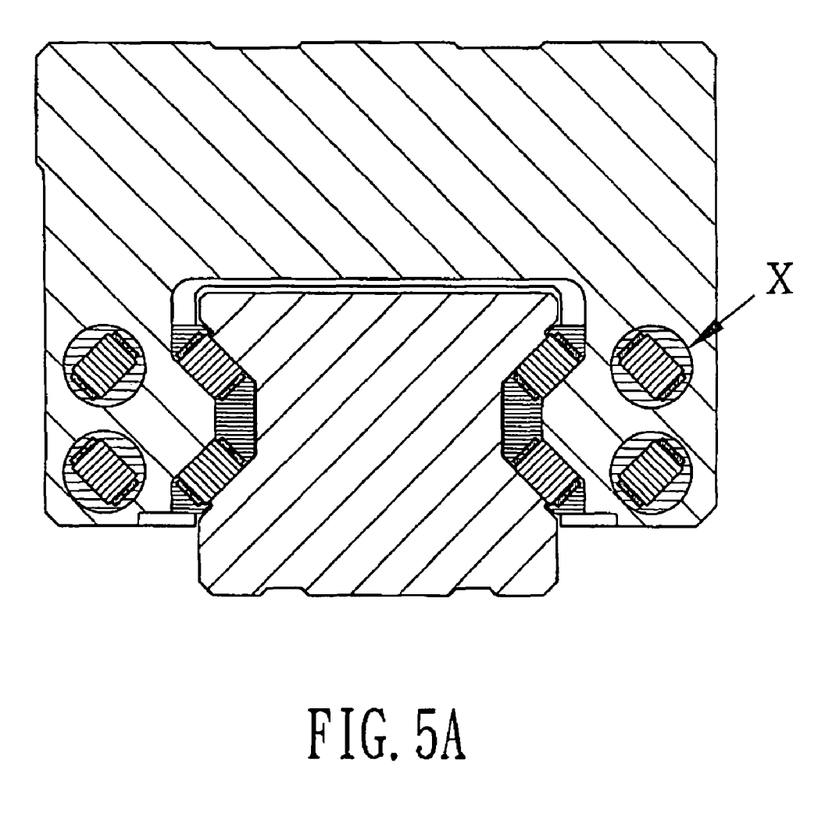
FIG. 5a is a cross sectional view of the roller chain for a linear guideway in accordance with the present invention.
Figure 5B:
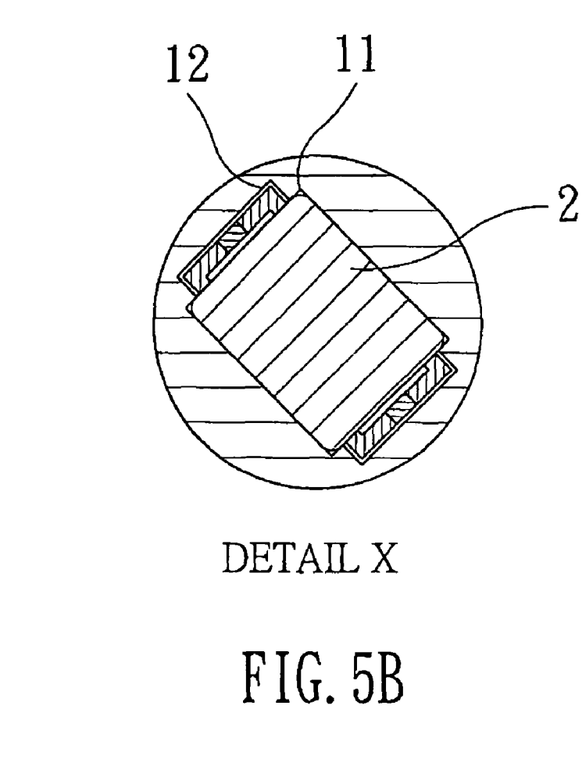

Referring to FIGS. 4, 5a, and 5b, a linear guideway 1 in accordance with the present invention comprises a rail 1a and a slide block 1b. The rail 1a is an elongated structure defined with rolling grooves 12 for the rollers. The slide block 1b is a reverse U-shaped structure defined with grooves for cooperating with the rolling groove 12 of the rail 1a, defining a rolling path for allowing the rollers 2 to circulate therein. To enable the rollers 2 to circulate endlessly, the slide block 1b must be provided at either end thereof with an end cap 1c, and a re-circulation path 11 is formed in the end cap 1c.

Figure 6:
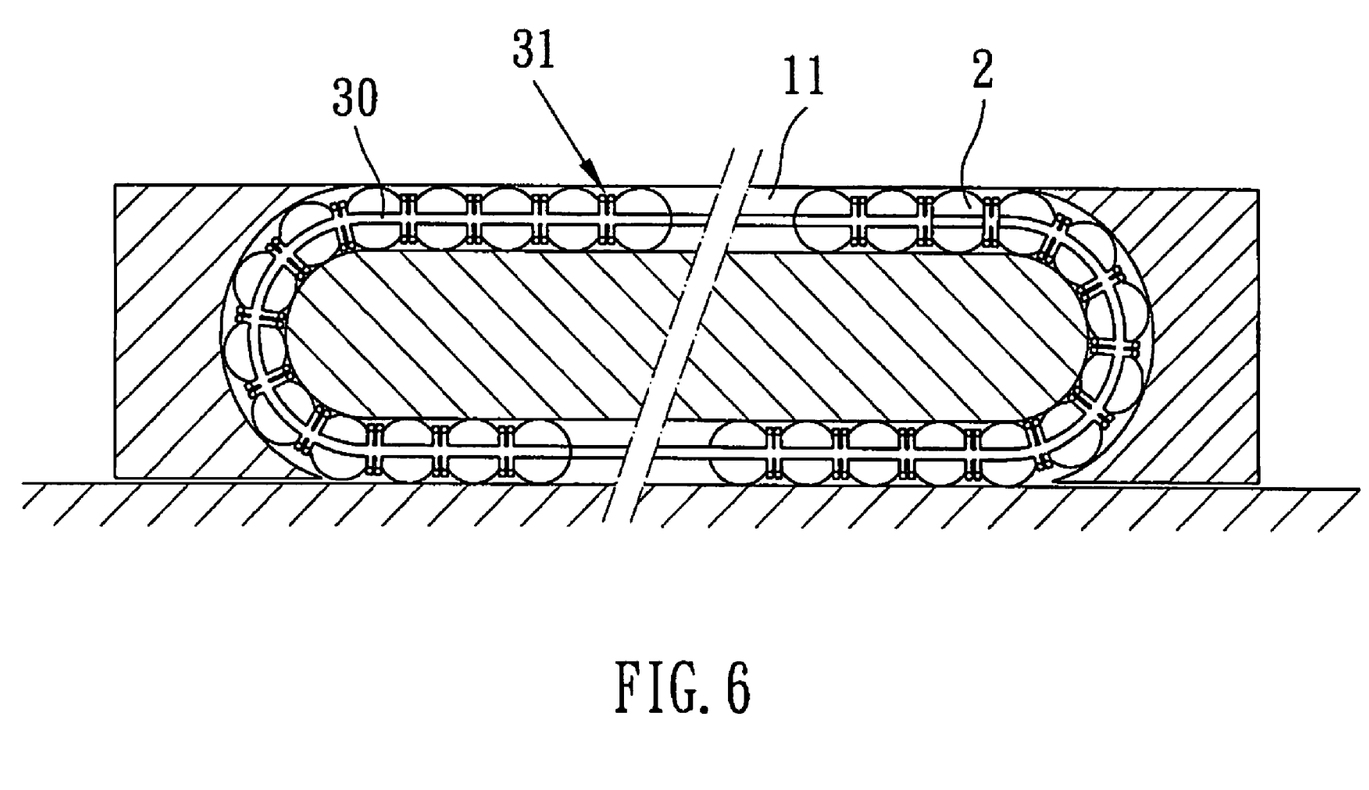
FIG. 6 is an illustrative view in accordance with the present invention of showing the rollers' circulation route.
Figure 7:
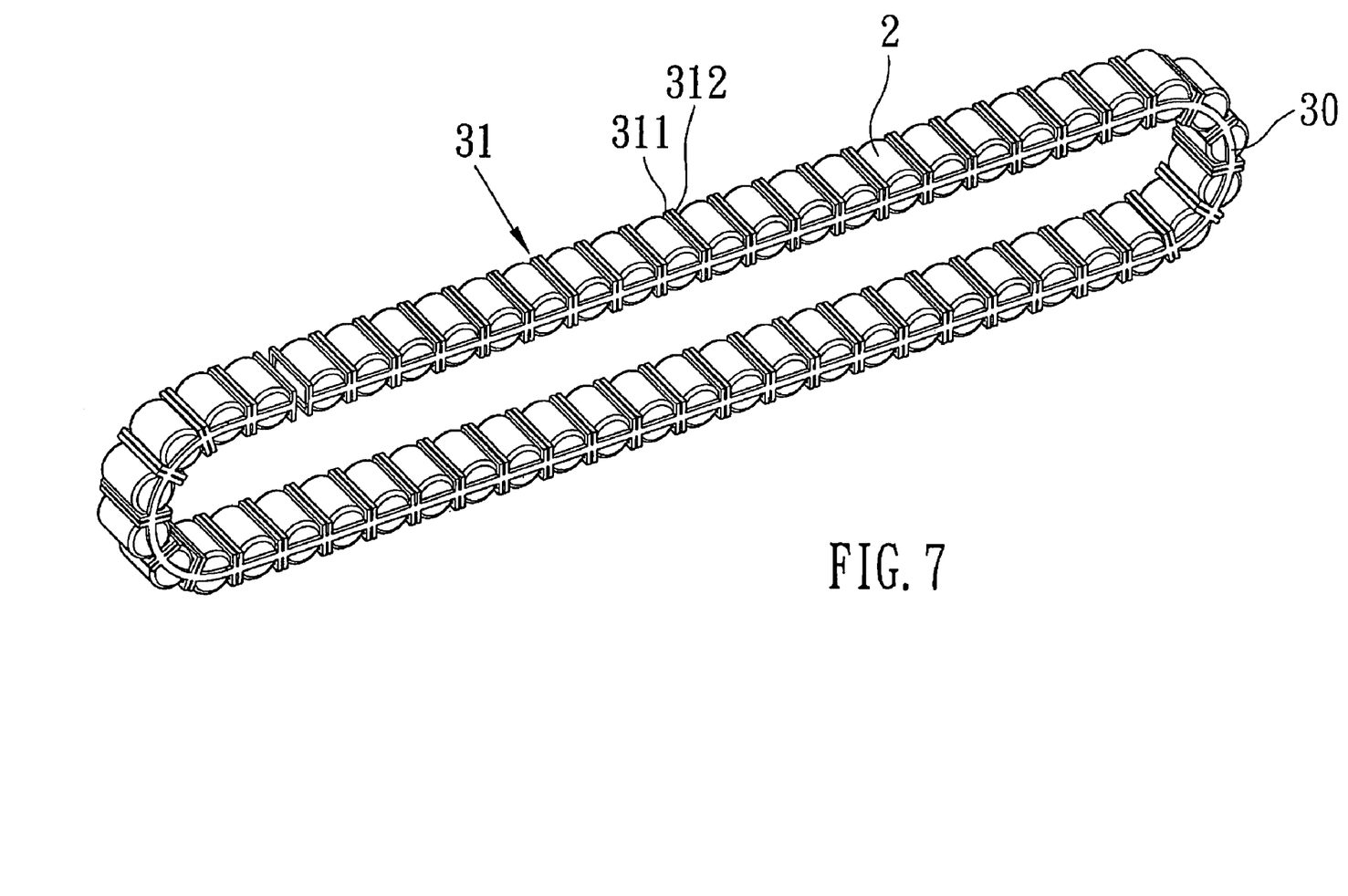
FIG. 7 is an assembly view of showing a roller chain in accordance with a first embodiment of the present invention.
Figure 8A:
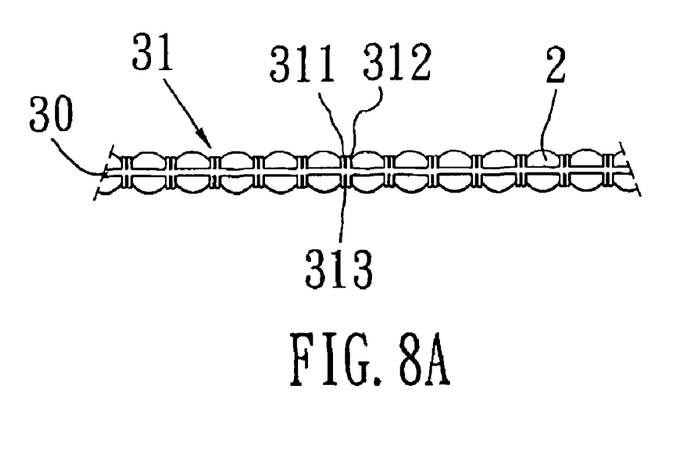
FIG. 8a is a front view of showing the roller chain in accordance with the first embodiment of the present invention.
Figure 8B:
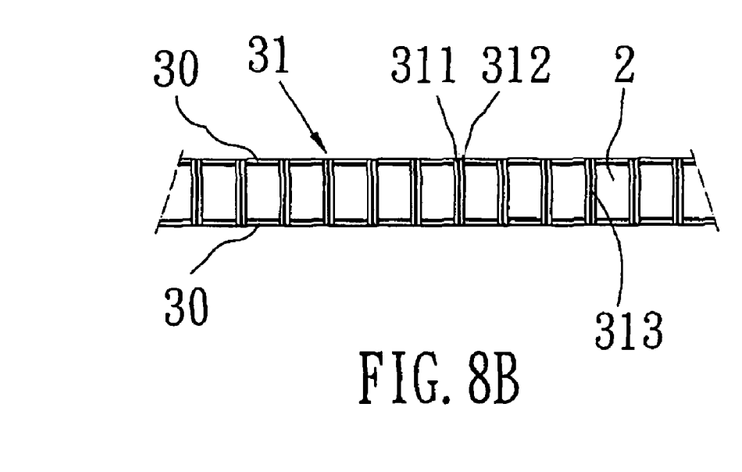
FIG. 8b is a side view of showing the roller chain in accordance with the first embodiment of the present invention.
Figure 8C:
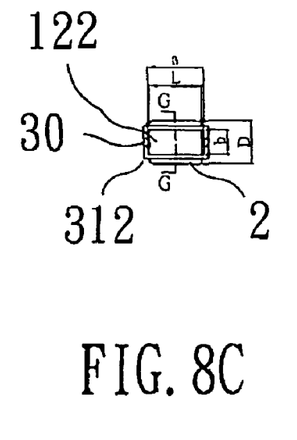
FIG. 8c is a top view of showing the roller chain in accordance with the first embodiment of the present invention.

FIG. 6 is an illustrative view in accordance with the present invention of showing the rollers' circulation route. FIG. 7 is an assembly view of showing that a roller chain in accordance with a first embodiment of the present invention.

The roller chain comprises a plurality of spacers 31 and two links 30. Each of the spacers 31 has two retaining portions 311 and 312 that are spaced apart form each other. The retaining portions 311 and 312 are a rectangular hollow structure for holding the rollers 2. The spacers 31 are arranged in the rolling direction of the respective rollers 2 and located at both sides of the respective rollers 2 to separate the rollers 2 from one another in such a manner that each two neighboring rollers 2 are separated by one spacer 31, that is, each two neighboring rollers 2 are separated by two spaced part retaining portions 311 and 312, so that the two neighboring rollers 2 can be separated from each other completely. Further, the The two links 30 are arranged at both ends of the rollers 2 and serve to connect the spacers 31 together.

To prevent the neighboring rollers 2 from indirect impact caused by the spacer 31 and to prevent the occurrence of noise caused by the indirect impact, in addition to being designed to be in line-to-line contact with the rollers 2, the spacers 31 must be arranged averagely, thus preventing the problems of the rollers during rolling motion, such as slant position and skip. Furthermore, a receiving space 313 is formed from the top to the bottom of the spacer 31 for receiving lubricant. The roller chain is a unitary structure, the spacers are flexible and made by injection molding, and these features facilitate mass production.

Referring to FIGS. 8a-8c and 9a-9b, the diameter and the length of the roller 2 are L and D, the length and the height of the hollow structure 111, 121 of the retaining portion are a and b, and they satisfy the relations a>1.0 L, b≦0.8 D. The inner surface 112, 122 of the spacers 31 is flat and has a predetermined thickness. The abovementioned arrangements make the spacers 31 have a line-to-line contact with the rollers 2 without interfering the circulating path. One side of each of the retaining portion 311, 312 is opposite to the rollers 2, and another side of the retaining portion 311, 312 doesn't contact any component, so that the two neighboring rollers 2 can be separated from each other completely.

Figure 9A:
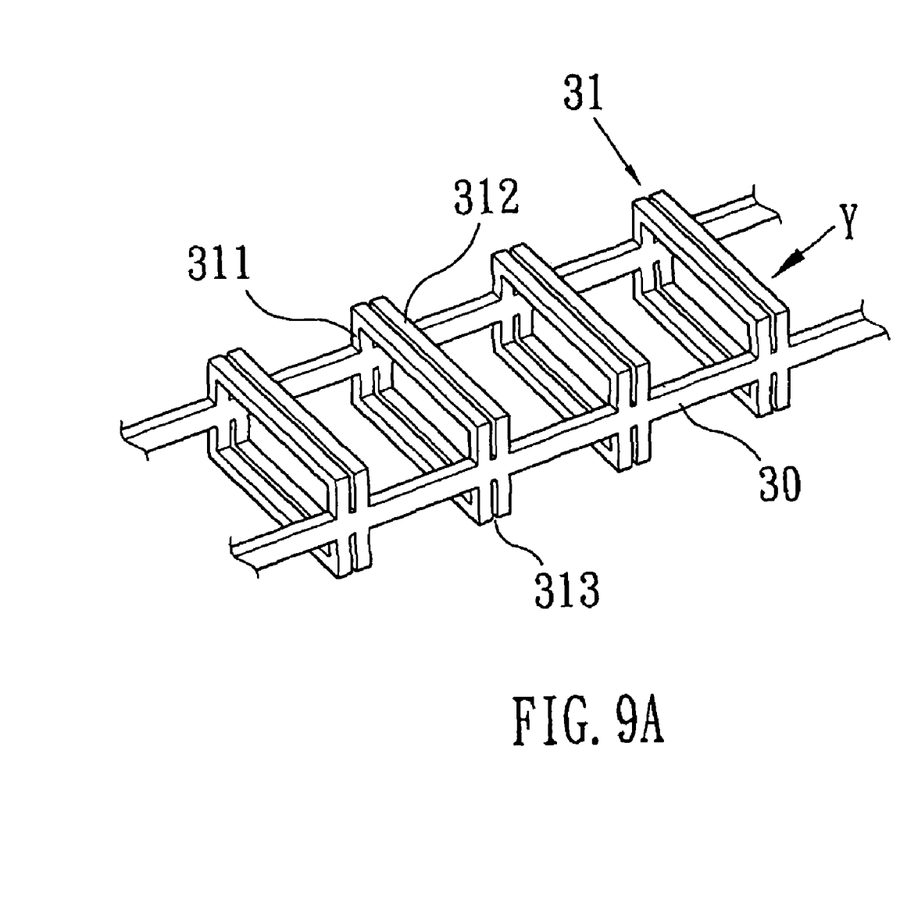
FIG. 9a is a perspective view of showing the roller chain in accordance with the first embodiment of the present invention, from the front, the side, and from the top.
Figure 9B:
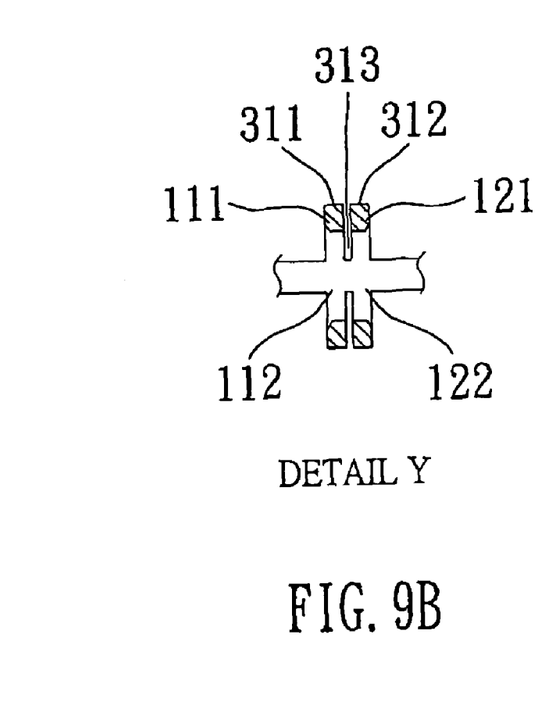

As shown in the left of FIG. 9, the receiving space 313 formed from the top to the bottom of the spacer 31 for receiving lubricant can supply lubricant to the rollers, making the linear guideway free of maintenance for a long time.

To summarize, the objective of the present invention is to provide a roller chain for a linear guideway, and more particularly to prevent the indirect impact between two neighboring rollers caused by the spacer therebetween, thus substantially reducing the impact-caused noise.

Hence, the impact energy caused when the spacer is impacted by the rollers will be converted into elastic energy, which prevents the indirect impact of two neighboring rollers caused by the spacer therebetween, thus effectively absorbing the impact force while substantially reducing the impact-caused noise.

As compared with the prior art, the present invention has the following functions:

1. One side of the each of the spacers is opposite to the rollers, while the other side doesn't contact any component, such an arrangement prevents the indirect impact of two neighboring rollers caused by the spacer therebetween, the resultant effect of impact and noise reduction is better than the prior art.

2. The spacers are in a line-to-line contact with the rollers, enforcing the rollers to be arranged averagely, thus preventing the problems of the rollers during rolling motion, such as slant position and skip. Hence, the rolling resistance of the linear guideway is smaller than that of the prior art.

3. The roller chain has the function of receiving lubricant and automatically lubricate the rollers, making the linear guideway free of maintenance for a long time.

4. The roller chain is a unitary structure, the spacers are flexible and made by injection molding, and these features facilitate mass production.

While we have shown and described various embodiments in accordance with the present invention, it is clear to those skilled in the art that further embodiments may be made without departing from the scope of the present invention.

What is claimed is:

1. A roller chain for a linear guideway being mounted on rollers and disposed in circulation path of the linear guideway, comprising:

a plurality of spacers and two links, each of the spacers including two spaced apart retaining portions, each retaining portion being rectangular-hollow in cross section and serving to hold the rollers;

the spacers being arranged in a rolling direction of the rollers and located at both sides of the respective rollers to separate the rollers from one another in such a manner that two neighboring rollers are separated by the two spaced part retaining portions, so that the two neighboring rollers are separated from each other completely; and each of the two links being an elongated structure located at both ends of the rollers and employed to connect the spacers together;

wherein a receiving space is formed from the top to the bottom of the spacer for receiving lubricant.

* * * * *